UNITED STATES PATENT OFFICE.

AUGUST BLANK AND MATTHIAS LATTEN, OF LEVERKUSEN, NEAR COLOGNE, GERMANY, ASSIGNORS TO FARBENFABRIKEN VORM. FRIEDR. BAYER & CO., OF ELBERFELD, GERMANY, A CORPORATION OF GERMANY.

DYES DERIVED FROM AMINOTRISAZO COMPOUNDS.

1,087,428.　　　Specification of Letters Patent.　　Patented Feb. 17, 1914.

No Drawing.　　Application filed March 25, 1913.　Serial No. 756,710.

*To all whom it may concern:*

Be it known that we, AUGUST BLANK and MATTHIAS LATTEN, doctors of philosophy, chemists, citizens of the German Empire, residing at Leverkusen, near Cologne-on-the-Rhine, Germany, have invented new and useful Improvements in Dyes Derived from Aminotrisazo Compounds, of which the following is a specification.

Our invention relates to the manufacture and production of new azo dyestuffs capable of dyeing unmordanted cotton in brown shades distinguished by their excellent fastness to light.

The process for their production consists in converting aminotrisazo compounds containing an acid group, such as sulfonic or carboxylic acids and which contain only an amino group but no free hydroxy group, into symmetrical diarylurea compounds by treatment with phosgen. The new dyes are after being dried and pulverized brownish powders soluble in cold water generally with a brown and in concentrated sulfuric acid with a greenish-blue coloration. Upon reduction with stannous chlorid and hydrochloric acid the corresponding amins, diamins one of which contains an acid group and carbonic acid, are obtained.

To illustrate our process, we can proceed as follows, the parts being by weight:—59.3 parts of the aminotrisazo product, obtained by combining diazotized aminoazobenzene-disulfonic acid with meta-toluidin, then diazotizing the product thus obtained and combining it with a second molecule of meta-toluidin, are dissolved in 1380 parts of water and the necessary quantity of sodium carbonate. After the addition of 13.8 parts of soda phosgen is introduced into this solution which has to be stirred and kept alkaline until the production of the urea is complete. The new coloring matter is filtered off and dried. It is after being dried and pulverized a brownish powder soluble in water with a yellowish-brown and in concentrated sulfuric acid (66° Bé.) with a greenish-blue coloration. When ice or cold water is added to it the greenish-blue solution changes to brownish-red. A brownish-red precipitate being obtained. The dye yields upon reduction with stannous chlorid and hydrochloric acid para-sulfanilic acid, phenylenediamin-sulfonic acid, 1.3.6-toluylenediamin and carbonic acid. It has most probably the formula:

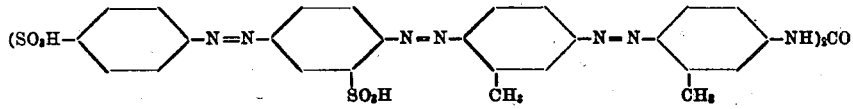

and dyes cotton in brown shades. Other trisazo dyes may be used, containing for instance chloro-anilin-sulfonic acid, para- or meta-sulfanilic acid, anilin-sulfonic-carboxylic acid, anilin, 2-aminonaphthalene-4.8-disulfonic acid, etc., as first components, and anilin ortho-toluidin, ortho-anisidin, cresidin, alpha-naphthylamin, 1.7-naphthylamin-sulfonic acid, etc., as second or third components. The second and third components may be either the same or different amins.

We claim:—

1. The new azo dyes being ureas of amino-trisazo compounds, which dyes are after being dried and pulverized brownish powders soluble in water with a brown and in concentrated sulfuric acid with a greenish-blue coloration; yielding upon reduction with stannous chlorid and hydrochloric acid generally the corresponding amins, diamins one of which contains an acid group and carbonic acid; dyeing cotton directly in brown shades distinguished by their excellent fastness to light, substantially as described.

2. The herein described new azo dye having most probably the formula:

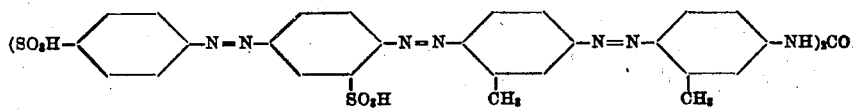

which is after being dried and pulverized a brown to brownish-red powder soluble in water with a yellowish-brown and in concentrated sulfuric acid (66 Bé.) with a greenish-blue coloration, which changes to brownish-red when ice or cold water is added to this solution and insoluble in cold concentrated soda lye; yielding upon reduction with stannous chlorid and hydrochloric acid para-sulfanilic acid, para-phenylenediamin-sulfonic acid, 1.3.6-toluylenediamin and $CO_2$, and dyeing cotton directly in brown shades, substantially as described.

In testimony whereof we have hereunto set our hands in the presence of two subscribing witnesses.

AUGUST BLANK. [L. S.]
MATTHIAS LATTEN. [L. S.]

Witnesses:
HELEN NUFER,
ALBERT NUFER.